(12) United States Patent
Liu et al.

(10) Patent No.: US 9,188,808 B2
(45) Date of Patent: Nov. 17, 2015

(54) DISPLAY DEVICE HAVING REFLECTIVE POLARIZER

(71) Applicants: Chin-Ku Liu, Hsin-Chu (TW); Cheng-Hsi Hsieh, Hsin-Chu (TW)

(72) Inventors: Chin-Ku Liu, Hsin-Chu (TW); Cheng-Hsi Hsieh, Hsin-Chu (TW)

(73) Assignee: Young Lighting Technology Inc., Hsin-Chu (TW)

( * ) Notice: Subject to any disclaimer, the term of this patent is extended or adjusted under 35 U.S.C. 154(b) by 262 days.

(21) Appl. No.: 13/860,534

(22) Filed: Apr. 11, 2013

(65) Prior Publication Data

US 2013/0271674 A1 Oct. 17, 2013

(30) Foreign Application Priority Data

Apr. 17, 2012 (CN) .......................... 2012 1 0112104

(51) Int. Cl.
*G02F 1/1347* (2006.01)
*G02F 1/1335* (2006.01)
*G02F 1/1334* (2006.01)

(52) U.S. Cl.
CPC ........ *G02F 1/133621* (2013.01); *G02F 1/1347* (2013.01); *G02F 1/1334* (2013.01); *G02F 1/1335* (2013.01); *G02F 1/133536* (2013.01); *G02F 2001/13478* (2013.01); *G02F 2001/133557* (2013.01); *G02F 2001/133618* (2013.01); *G02F 2203/01* (2013.01)

(58) Field of Classification Search
CPC ................ G02F 1/1335; G02F 1/1347; G02F 2001/13478; G02F 1/133536; G02F 1/13362; G02F 2203/01; G02F 2203/07

USPC .......................................................... 349/74
See application file for complete search history.

(56) References Cited

U.S. PATENT DOCUMENTS

| 6,459,461 | B1 | 10/2002 | Umemoto et al. |
| 7,380,953 | B2 * | 6/2008 | Onishi et al. ............... 362/23.18 |
| 7,880,830 | B2 * | 2/2011 | Ma et al. .......................... 349/65 |
| 2005/0073627 | A1 * | 4/2005 | Akiyama .......................... 349/65 |
| 2011/0261291 | A1 * | 10/2011 | Park et al. ....................... 349/65 |

FOREIGN PATENT DOCUMENTS

| CN | 1826553 | 8/2006 |
| CN | 1851548 | 10/2006 |
| CN | 102236203 | 11/2011 |
| TW | 201137458 | 11/2011 |
| WO | 2008020686 | 2/2008 |

\* cited by examiner

*Primary Examiner* — Paisley L Arendt
(74) *Attorney, Agent, or Firm* — Jianq Chyun IP Office

(57) ABSTRACT

A display device including a transmission display panel, a first backlight module, a first polarizer, and a reflective polarizer is provided. The first backlight module includes a first light guide plate and a light emitting unit. The first light guide plate has a first surface, a second surface opposite to the first surface, and a first light incident surface connecting the first surface and the second surface. The first surface is between the second surface and the transmission display panel. The light emitting unit is disposed beside the first light incident surface. The transmission display panel is between the first polarizer and the first surface. The second surface is between the first surface and the reflective polarizer.

21 Claims, 12 Drawing Sheets

FIG. 8

DISPLAY DEVICE HAVING REFLECTIVE POLARIZER

CROSS-REFERENCE TO RELATED APPLICATION

This application claims the priority benefit of China application serial no. 201210112104.2, filed on Apr. 17, 2012. The entirety of the above-mentioned patent application is hereby incorporated by reference herein and made a part of this specification.

BACKGROUND OF THE INVENTION

1. Field of the Invention

The invention generally relates to a display device, and more particularly, to a display device with a transparent display function.

2. Description of Related Art

A conventional transparent display is generated by removing the backlight module in a normal display panel. In other words, a conventional transparent display includes a lower polarizer, an active device array substrate, a twisted nematic liquid crystal layer, a color filter substrate, and an upper polarizer, wherein the transmission axis direction of the upper polarizer is perpendicular to the transmission axis direction of the lower polarizer. A conventional transparent display uses a background light beam as its backlight. When the intensity of the background light beam is not enough, the conventional transparent display cannot display images clearly. When the background light beam is a non-white light beam, the conventional transparent display cannot present the image colors correctly. Additionally, a transparent display device is disclosed in the Taiwan Public Patent No. 201137458. The transparent display device includes a second polarizer, a liquid crystal display (LCD) panel, a light guide plate, a reflective polarizer, and a light source disposed beside the light guide plate.

SUMMARY OF THE INVENTION

Accordingly, the present invention provides a display device offering optimal display effects.

Additional purposes and/or advantages of the invention will be disclosed in part in the description which follows and, in part, will be obvious from the description, or may be learned by the technical features of the invention.

An embodiment of the invention provides a display device in order to encompass the partial purposes or all of the purposes or other purposes. The display device includes a transmission display panel, a first backlight module, a first polarizer, and a reflective polarizer. The first backlight module includes a first light guide plate and a light emitting unit. The first light guide plate has a first surface, a second surface opposite to the first surface, and a first light incident surface connecting the first surface and the second surface. The first surface is between the second surface and the transmission display panel. The light emitting unit is disposed beside the first light incident surface. The transmission display panel is between the first polarizer and the first surface. The second surface is between the first surface and the reflective polarizer.

According to an embodiment of the invention, the display device further includes a second polarizer and a light modulation panel. The first surface of the first light guide plate is between the second surface and the second polarizer. The second surface of the first light guide plate is between the light modulation panel and the first surface of the first light guide plate. The light modulation panel is between the second surface of the first light guide plate and the reflective polarizer.

According to an embodiment of the invention, in the display device, the light emitting unit includes at least a first color light emitting element, at least a second color light emitting element, and at least a third color light emitting element. The first color light emitting element, the second color light emitting element, and the third color light emitting element are capable of sequentially emitting a first color light beam, a second color light beam, and a third color light beam according to an image displayed on the transmission display panel.

According to an embodiment of the invention, the light emitting unit is capable of emitting a light beam in the display device. The light beam includes a first sub light beam in a first polarization state and a second sub light beam in a second polarization state. The first polarization state is orthogonal to the second polarization state. After the second sub light beam passes through a enabled area of the transmission display panel, the polarization state of the second sub light beam remains unchanged. After the second sub light beam passes through an disabled area of the transmission display panel, the polarization state of the second sub light beam changes from the second polarization state to the first polarization state.

According to an embodiment of the invention, the first polarizer has a first transmission axis parallel to the first polarization state, and the reflective polarizer has a second transmission axis parallel to the first polarization state and is capable of reflecting the second sub light beam in the second polarization state in the display device.

According to an embodiment of the invention, the first polarizer has a first transmission axis parallel to the second polarization state, and the reflective polarizer has a second transmission axis parallel to the first polarization state and is capable of reflecting the second sub light beam in the second polarization state in the display device.

According to an embodiment of the invention, the transmission display panel is a monochromatic panel, and the monochromatic panel includes a first substrate, a second substrate opposite to the first substrate, and a liquid crystal layer between the first substrate and the second substrate in the display device.

According to an embodiment of the invention, the first backlight module further includes a plurality of optical microstructures disposed on the first surface of the first light guide plate in the display device.

According to an embodiment of the invention, the second surface of the first light guide plate is parallel to a surface of the transmission display panel, and the first surface is tilted relatively to the surface of the transmission display panel in the display device.

According to an embodiment of the invention, the display device further includes a host in the display device. The host is detachable and assembled with the display device and includes a second backlight module. The reflective polarizer is between the second backlight module and the first backlight module.

According to an embodiment of the invention, when the host is detachable from the display device, the first backlight module is turned on and the second backlight module is turned off, and when the host is assembled with the display device, the first backlight module is turned off and the second backlight module is turned on in the display device.

According to an embodiment of the invention, after the second sub light beam in the second polarization state passes through the enabled area of the light modulation panel, the polarization state of the second sub light beam changes to the first polarization state, and after the second sub light beam in the second polarization state passes through the disabled area of the light modulation panel, the polarization state of the second sub light beam remains unchanged in the display device.

According to an embodiment of the invention, the first polarizer has a first transmission axis equal to the first polarization state in the display device. The reflective polarizer has a second transmission axis equal to the second polarization state and is capable of reflecting the second sub light beam in the first polarization state. The second polarizer has a third transmission axis equal to the second polarization state.

According to an embodiment of the invention, the display device further includes an third polarizer between the second surface of the first light guide plate and the light modulation panel in the display device.

According to an embodiment of the invention, the third polarizer has a fourth transmission axis equal to the polarization state of the third transmission axis of the second polarizer in the display device.

According to an embodiment of the invention, the display device further includes a fourth polarizer, wherein the reflective polarizer is between the fourth polarizer and the light modulation panel, the fourth polarizer has a fifth transmission axis, and the polarization state of the fifth transmission axis is the equal to the polarization state of the second transmission axis of the reflective polarizer.

According to an embodiment of the invention, the display device further includes a wireless transmission module for transmitting signals between the host and the transmission display panel or between the host and the light modulation panel.

According to an embodiment of the invention, the display device further includes a sliding device disposed between the host and the transmission display panel, wherein the sliding device allows the host to slide relatively to the transmission display panel.

According to an embodiment of the invention, the included angle between the direction of the pixel array arrangement in the light modulation panel and the direction of the pixel array arrangement direction in the transmission display panel is smaller than or equal to 15° in the display device.

According to an embodiment of the invention, the display device further includes a photosensor. The photosensor is capable of sensing the brightness of ambient light and provide a sensing signal to adjust the driving voltage of the light modulation panel, so as to change the transparency of the display device.

According to an embodiment of the invention, the display device further includes a touch screen disposed on the surface of the first polarizer, wherein the first polarizer is between the touch screen and the transmission display panel.

According to an embodiment of the invention, the display device further includes a battery for supplying power to the display device.

According to an embodiment of the invention, the display device further includes an image capturing module disposed beside the reflective polarizer.

According to an embodiment of the invention, the display device further includes a non-transmission display panel. The non-transmission display panel and the transmission display panel are disposed side by side to generate a display image of the display device.

As described above, the display device disclosed by one embodiment of the invention is affected by the backlight module and the reflective polarizer, the image displayed on a transmission display panel is hardly affected by a background light beam. Users can still see the image displayed on the transmission display panel even when the intensity of the background light beam is not enough.

The above and other exemplary embodiments, features, aspects, and advantages of the invention will be described and become more apparent from the detailed description of exemplary embodiments when read in conjunction with accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention particularly.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

First Embodiment

Figure 1:
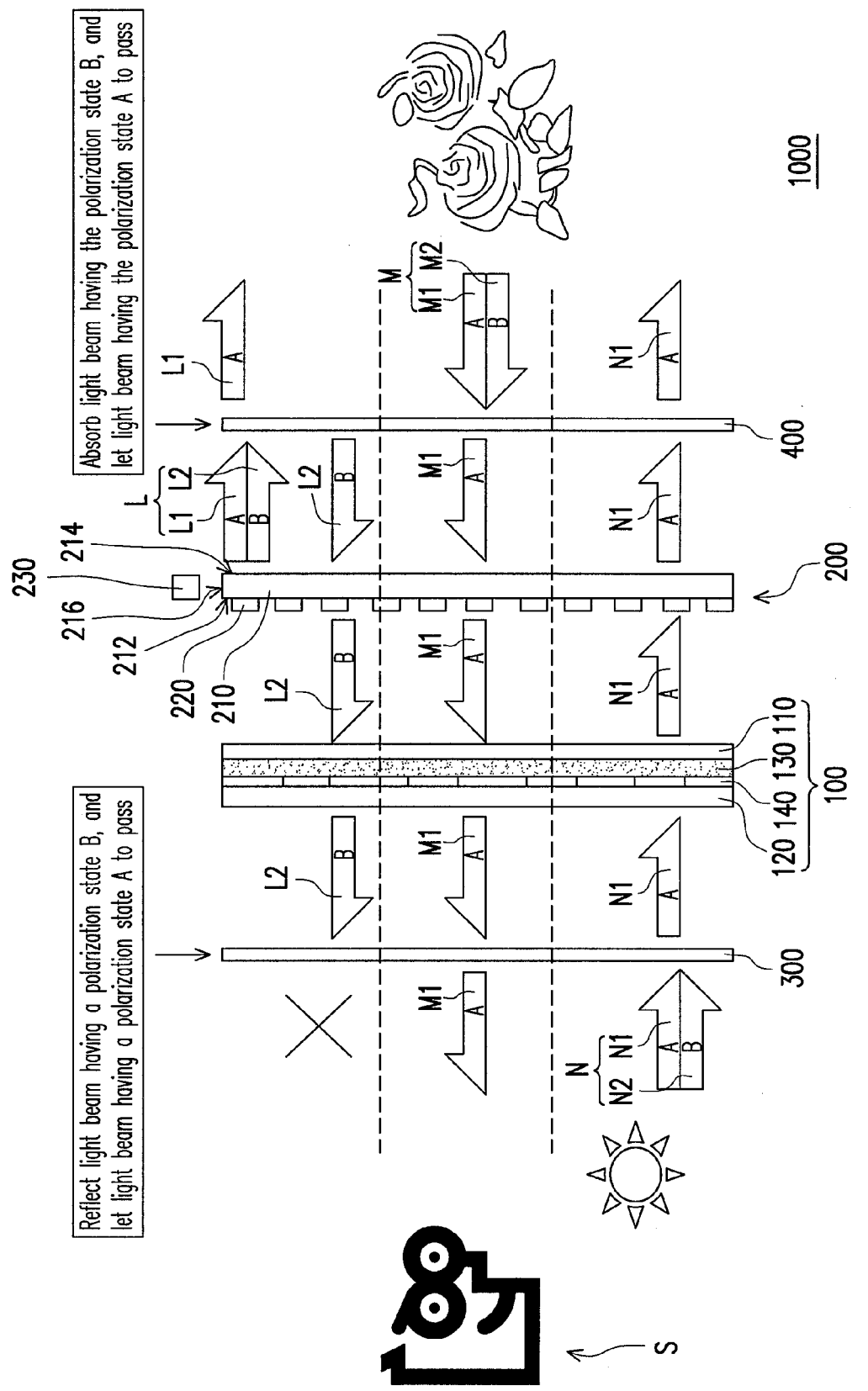
FIG. 1 and FIG. 3 are schematic views of a display device in accordance with the first embodiment of the invention.

FIG. 1 is a schematic view of a display device according to the first embodiment of the invention. Referring to FIG. 1, the display device 1000 in the present embodiment includes a transmission display panel 100, a first backlight module 200, a first polarizer 300, and a reflective polarizer 400. The first backlight module 200 includes a first light guide plate 210 and a light emitting unit 230. The first light guide plate 210 has a first surface 212, a second surface 214 opposite to the first surface 212, and a first light incident surface 216 connecting the first surface 212 and the second surface 214. The first surface 212 is between the second surface 214 and the transmission display panel 100. The transmission display panel 100 is between the first polarizer 300 and the first surface 212. The second surface 214 is between the first surface 212 and the reflective polarizer 400. The first light guide plate 210 may be a board-shaped or a wedge-shaped light guide plate (not shown). However, the invention is not limited thereto. The surface of the first light guide plate 210 may be smooth or disposed with microstructures. However, the invention is not limited thereto either. FIG. 1 illustrates an embodiment with a plurality of optical microstructures 220, wherein the optical microstructures 220 are disposed on the first surface 212.

In the present embodiment, the light emitting unit 230 is capable of emitting a light beam L. The light beam L enters the first light guide plate 210 through the first light incident surface 216. Most of the light beam L is guided by the optical microstructures 220 to leave the first light guide plate 210 from the second surface 214. The light beam L includes a first sub light beam L1 in a first polarization state A and a second sub light beam L2 in a second polarization state B. In the present embodiment, the first polarization state A is orthogonal to the second polarization state B. The optical microstructures 220 may be printing dots, inkjet dots, protruded microstructures relative to the first surface 212, recessed microstructures relative to the first surface 212, or a combination of aforementioned microstructures. However, the invention is not limited thereto. In the present embodiment, the light emitting unit 230 may be a plurality of light emitting diodes (LEDs) capable of emitting white light. However, the invention is not limited thereto. In other embodiments, the light emitting unit 230 includes at least one first color light emitting element, at least one second color light emitting element, and at least one third color light emitting element (for example, a light emitting element capable of emitting red light, a light emitting element capable of emitting green light, and a light emitting element capable of emitting blue light). The first color light emitting element, the second color light emitting element, and the third color light emitting element sequentially emit a first color light beam (for example, a red light beam), a second color light beam (for example, a green light beam), and a third color light beam (for example, a blue light beam) referring to an image displayed on the transmission display panel 100, so that the display device 1000 can display a full color image.

In the present embodiment, after the second sub light beam L2 passes through the enabled area of the transmission display panel 100, the polarization state of the second sub light beam L2 remains unchanged. After the second sub light beam L2 passes through the disabled area of the transmission display panel 100, the polarization state of the second sub light beam L2 changes from the second polarization state B to the first polarization state A. The enabled mode of a display panel (i.e., whether the polarization state of the light beam is changed after the display panel is enabled) is determined by the orientation of the arrangement of the liquid crystal in the display panel. In other words, some types of display panels change the polarization state of a passing light beam after the display panels are enabled, but some other types of display panels do not change the polarization state of a passing light beam after the display panels are enabled. However, the invention is not limited thereto. To be specific, when the three color light emitting elements are adopted to sequentially emit three color light beams and accordingly display full color images, the transmission display panel 100 in the present embodiment may be a monochromatic display panel. Namely, the transmission display panel 100 in the present embodiment includes a first substrate 110, a second substrate 120 opposite to the first substrate 110, and a liquid crystal layer 130 between the first substrate 110 and the second substrate 120 but does not include any color filter. However, the invention is not limited thereto. The transmission display panel 100 may also be a color display panel including a color filter 140 (FIG. 1 illustrates an embodiment including a color filter).

In the present embodiment, the transmission display panel 100 further includes a plurality of active elements (not shown) disposed between the first substrate 110 and the liquid crystal layer 130. These active elements are capable of respectively driving the liquid crystal layer 130 in the corresponding areas so that the transmission display panel 100 can display images. The liquid crystal layer 130 in the present embodiment may be a twisted nematic liquid crystal layer. However, the invention is not limited thereto. The transmission display panel 100 may also be a vertical alignment liquid crystal display (LCD) panel, an in-plane switching LCD panel, a super twisted nematic LCD panel, a polymer dispersed liquid crystal (PDLC) LCD panel, or any other suitable type of display panel.

In the present embodiment, the first polarizer 300 has a first transmission axis parallel to the first polarization state A. The reflective polarizer 400 has a second transmission axis parallel to the first polarization state A and is capable of reflecting the second sub light beam L2 in the second polarization state B. In the present embodiment, the reflective polarizer 400 may be a wire grid polarizer in a conical configuration or a dual brightness enhancement film (DBEF) from 3M company, however, the invention is not limited thereto. The reflective polarizer 400 may also be any other type of reflective polarizer.

Figure 2:
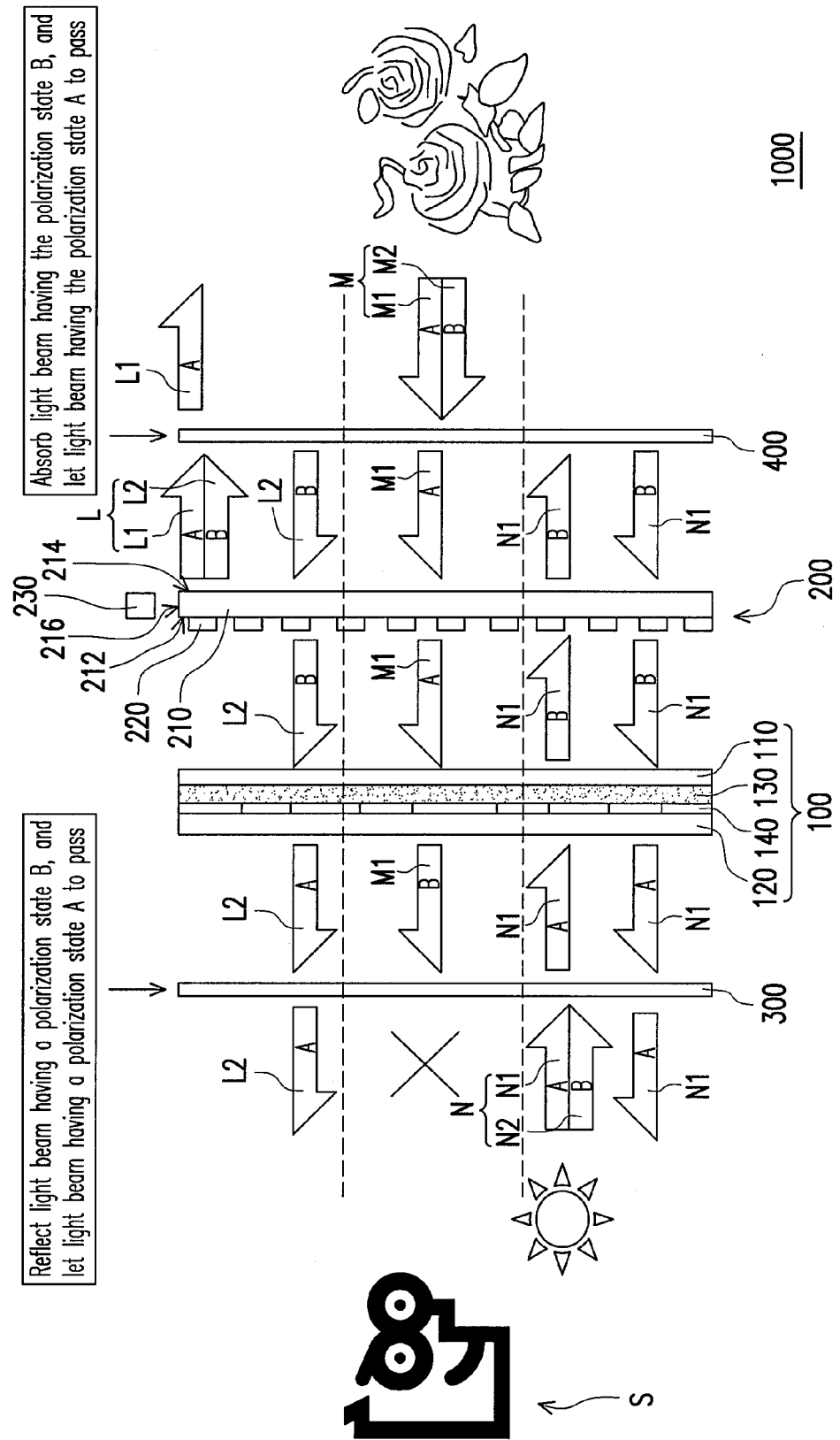
FIG. 2 illustrates the transmissions of a light beam emitted by a first backlight module, a background light beam, and an ambient light beam when a display device is in a display mode in accordance with the first embodiment of the invention.

Referring to FIG. 1 and FIG. 2, the transmissions of the light beam L emitted by the first backlight module 200, a background light beam M, and an ambient light beam N in the display device 1000 of the present embodiment will be respectively described. A user can see both the background through the display device 1000 and the image carried by the transmission display panel 100. For the convenience of description, FIG. 1 illustrates the transmissions of the light beam L emitted by the first backlight module 200, the background light beam M, and the ambient light beam N in the display device 1000 of the present embodiment when all the pixels of the transmission display panel 100 are enabled. The transmission of the light beam L emitted by the first backlight module 200 in the display device 1000 will be explained first referring to the upper part of FIG. 1. Most of the light beam L emitted by the first backlight module 200 is transmitted to the reflective polarizer 400 through the second surface 214. The first sub light beam L1 in the first polarization state A of the light beam L passes through the reflective polarizer 400 to leave the display device 1000. The second sub light beam L2 in the second polarization state B of the light beam L is reflected by the reflective polarizer 400 to pass through the first light guide plate 210 and reach the transmission display panel 100. In the present embodiment, when part of the pixels of the transmission display panel 100 in the display device 1000 are enabled (in FIG. 1, all the pixels are enabled), at this time, after the second sub light beam L2 in the second polarization state B passes through the transmission display panel 100, the polarization state of the second sub light beam L2 remains unchanged. After that, the second sub light beam L2 in the second polarization state B can transmit to the first polarizer 300. In the present embodiment, because the first transmission axis of the first polarizer 300 is parallel to the first polarization state A and the first polarization state A is perpendicular to the second polarization state B, the second sub light beam L2 in the second polarization state B cannot pass through the first polarizer 300. In other words, the user S should see a black image displayed on the transmission display panel 100.

The transmission of the background light beam M in the display device 1000 will be explained referring to the middle part of FIG. 1. The background light beam M also includes a sub light beam M1 in a first polarization state A and a sub light beam M2 in a second polarization state B. The sub light beam M1 in the first polarization state A of the background light beam M passes through the reflective polarizer 400. The sub light beam M1 that passes through the reflective polarizer 400 and has the first polarization state A further passes through the first light guide plate 210 to reach the transmission display panel 100. In the present embodiment, when part of the pixels of the transmission display panel 100 of the display device 1000 is enabled, at this time, after the sub light beam M1 in the first polarization state A passes through the transmission display panel 100, the polarization state of the sub light beam M1 remains unchanged. After that, the sub light beam M1 in the first polarization state A transmits to the first polarizer 300. Because the first transmission axis of the first polarizer 300 in the present embodiment is parallel to the first polarization state A, the sub light beam M1 in the first polarization state A can pass through the first polarizer 300. At this time, the user S can see the background. In other words, the display device 1000 is almost transparent to the user S. In a conventional transparent display, each pixel on the adopted color LCD panel has three (red, green, and blue) small pixels, and the color presented by each pixel in human eyes is accomplished by supplying different enabling energy to the red, green, and blue small pixels. However, to allow a user to see the background (i.e., to allow the background light beam to pass through the first polarizer 300), the background light beam is allowed to pass through the positions on the first polarizer 300 corresponding to the small pixels that originally receive no or little light. Thus, the light intensities on the red, green, and blue small pixels of each pixel are affected, and the color presented by the pixel is further changed.

Referring to the bottom part of FIG. 1, the transmission of the ambient light beam N in the display device 1000 will be explained. The ambient light beam N also includes a sub light beam N1 in a first polarization state A and a sub light beam N2 in a second polarization state B. The sub light beam N1 in the first polarization state A of the ambient light beam N passes through the first polarizer 300 to reach the transmission display panel 100. In the present embodiment, part of the pixels of the transmission display panel 100 in the display device 1000 is enabled. At this time, after the sub light beam N1 in the first polarization state A passes through the transmission display panel 100, the polarization state of the sub light beam N1 remains unchanged. After that, the sub light beam N1 in the first polarization state A passes through the first light guide plate 210 to reach the reflective polarizer 400. Then, the sub light beam N1 passes through the reflective polarizer 400 to leave the display device 1000. In other words, in the display device 1000 of the present embodiment, the ambient light beam N does not interfere with the presentation of the background or the brightness of a black image.

FIG. 2 illustrates the transmission of a light beam emitted by a first backlight module, a background light beam, and an ambient light beam in the display device referring to the first embodiment of the invention. For the convenience of description, FIG. 2 illustrates the transmission of the light beam L emitted by the first backlight module 200, the background light beam M, and the ambient light beam N in the display device 1000 in the present embodiment when all the pixels of the transmission display panel 100 are disabled. Referring to the upper part of FIG. 2, first, the transmission of the light beam L emitted by the first backlight module 200 in the display device 1000 will be explained. Most part of the light beam L emitted by the first backlight module 200 is transmitted to the reflective polarizer 400 through the second surface 214. The light beam L1 in the first polarization state A of the light beam L passes through the reflective polarizer 400 to leave the display device 1000. The second sub light beam L2 in the second polarization state B of the light beam L is reflected by the reflective polarizer 400 to pass through the first light guide plate 210 and transmit to the transmission display panel 100. In the present embodiment, part of the pixels of the transmission display panel 100 of the display device 1000 are disabled (in FIG. 2, all the pixels are disabled). At this time, after the second sub light beam L2 in the second polarization state B passes through the transmission display panel 100, the polarization state of the second sub light beam L2 changes to the first polarization state A. The second sub light beam L2 in the first polarization state A reaches the first polarizer 300 after it passes through the transmission display panel 100. Because the first transmission axis of the first polarizer 300 in the present embodiment is parallel to the first polarization state A, the second sub light beam L2 in the first polarization state A can pass through the first polarizer 300. In other words, herein the user S should see a white image displayed on the transmission display panel 100 (i.e., when a pixel is completely disabled, the pixel presents white color, and with different enabled states of different pixels, the user S should see images composed of pixels of the transmission display panel 100 in different colors).

Referring to the middle part of FIG. 2, the transmission of the background light beam M in the display device 1000 will be explained. The sub light beam M1 in the first polarization state A of the background light beam M passes through the reflective polarizer 400. The sub light beam M1 that passes through the reflective polarizer 400 and has the first polarization state A passes through the first light guide plate to reach the transmission display panel 100. In the present embodiment, part of the pixels of the transmission display panel 100 of the display device 1000 is disabled. At this time, after the sub light beam M1 in the first polarization state A passes through the transmission display panel 100, the polarization state of the sub light beam M1 changes to the second polarization state B. The sub light beam M1 in the second polarization state B transmits to the first polarizer 300 after it passes through the transmission display panel 100. Because the first transmission axis of the first polarizer 300 is parallel to the first polarization state A and the first polarization state A is perpendicular to the second polarization state B, the sub light beam M1 in the second polarization state B is blocked by the first polarizer 300 and won't transmit to the eyes of the user S in the present embodiment. In other words, the user S observes the colors normally presented from the pixels of the transmission display panel 100, and the background light beam M does not affect the pixels of the transmission display panel 100 observed by the user S. To be specific, in one embodiment of the invention, when light emitting elements of three different colors are adopted to sequentially emit light beams of three different colors in order to display full color images, and when an monochromatic transmission display panel 100 is adopted, the colors presented by a pixel temporarily remained in human eyes is formed by the lights sequentially emitted by the light emitting elements of different colors. When the second sub light beam L2 emitted by the first backlight module 200 passes through a pixel on the display panel, the sub light beam M1 cannot passes through the pixel therefore does not affect the colors presented by the pixel. Since the colors presented by each pixel is not composed of color light beams with different intensities that pass through the three small pixels, the problem in conventional transparent displays that the image colors cannot be correctly presented when the background light beam is non-white can be resolved.

Referring to the bottom part of FIG. 2, the transmission of the ambient light beam N in the display device 1000 will be explained. The sub light beam N1 in the first polarization state A of the ambient light beam N passes through the first polarizer 300 to reach the transmission display panel 100. When part of the pixels of the transmission display panel 100 of the display device 1000 is disabled in the present embodiment, at this time, after the sub light beam N1 in the first polarization state A passes through the transmission display panel 100, the polarization state of the sub light beam N1 changes to the second polarization state B. After that, the sub light beam N1 in the second polarization state B passes through the first light guide plate 210 to reach the reflective polarizer 400. The sub light beam N1 transmitted to the reflective polarizer 400 is reflected by the second polarization state B and sequentially passes through the first light guide plate 210 and the transmission display panel 100. After the sub light beam N1 in the second polarization state B passes through the transmission display panel 100, the polarization state of the sub light beam N1 changes to the first polarization state A, and then the sub light beam N1 passes through the first polarizer 300. In other words, part of the ambient light beam N can be served as a backlight source of the transmission display panel 100 so that the brightness of images displayed by the transmission display panel 100 can be further increased.

It should be noted that the enabled mode of the transmission display panel 100, the direction of the first transmission axis of the first polarizer 300, and the direction of the second transmission axis of the reflective polarizer 400 are used as examples for describing a display device provided by the invention but are not intended to limit the scope of the invention. In other embodiments, the transmission display panel 100 may also be a vertical alignment LCD panel, an in-plane switching LCD panel, a super twisted nematic LCD panel, a polymer dispersed liquid crystal (PDLC) LCD panel, or any other type of display panel. The polarization state of the first transmission axis of the first polarizer 300 may be parallel to the polarization state of the second transmission axis of the reflective polarizer 400, which can be appropriately designed according to the enabled mode or the transmission display panel 100.

Figure 3:
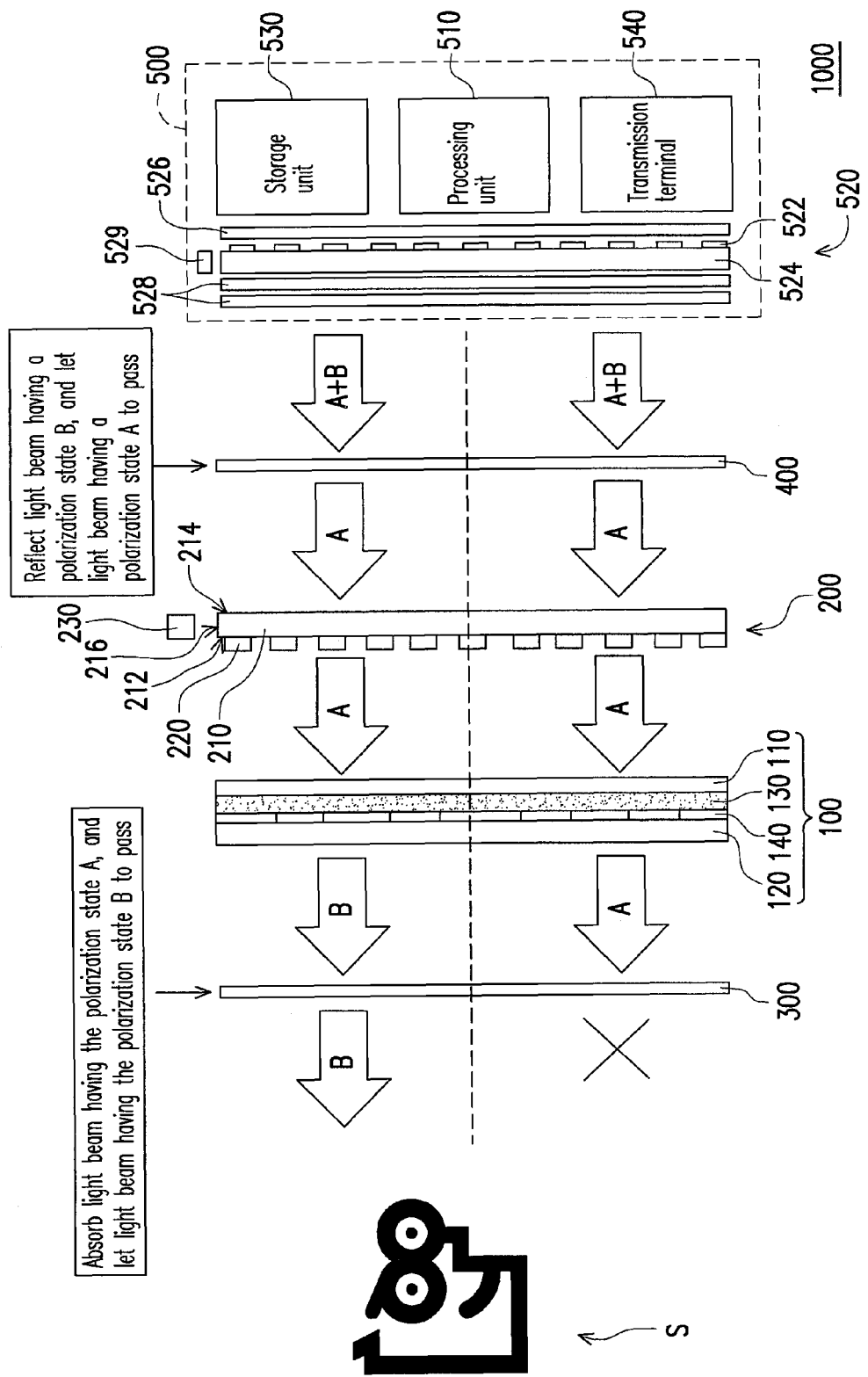

FIG. 3 is a schematic view of a display device according to the first embodiment of the invention. Referring to FIG. 3, the display device 1000 in the present embodiment may selectively include a host 500. The host 500 has a processing unit 510 and a second backlight module 520. The host 500 may not include processing unit 510 but only the second backlight module 520. For example, the processing unit and the display can be separated in a liquid crystal screen or a notebook computer. However, the invention is not limited thereto. FIG. 3 only illustrates the host 500 has both the processing unit 510 and the second backlight module 520. The second backlight module 520 may dispose between the processing unit 510 and the reflective polarizer 400. In the present embodiment, the second backlight module 520 includes a light guide plate 524 having optical microstructures 522, a reflector 526 disposed between the light guide plate 524 and the processing unit 510, a plurality of optical films 528 disposed beside the light guide plate 524, and a light emitting unit 529 disposed beside the light guide plate 524. In the present embodiment, the host 500 further includes a storage unit 530 and a transmission terminal 540.

Figure 11:
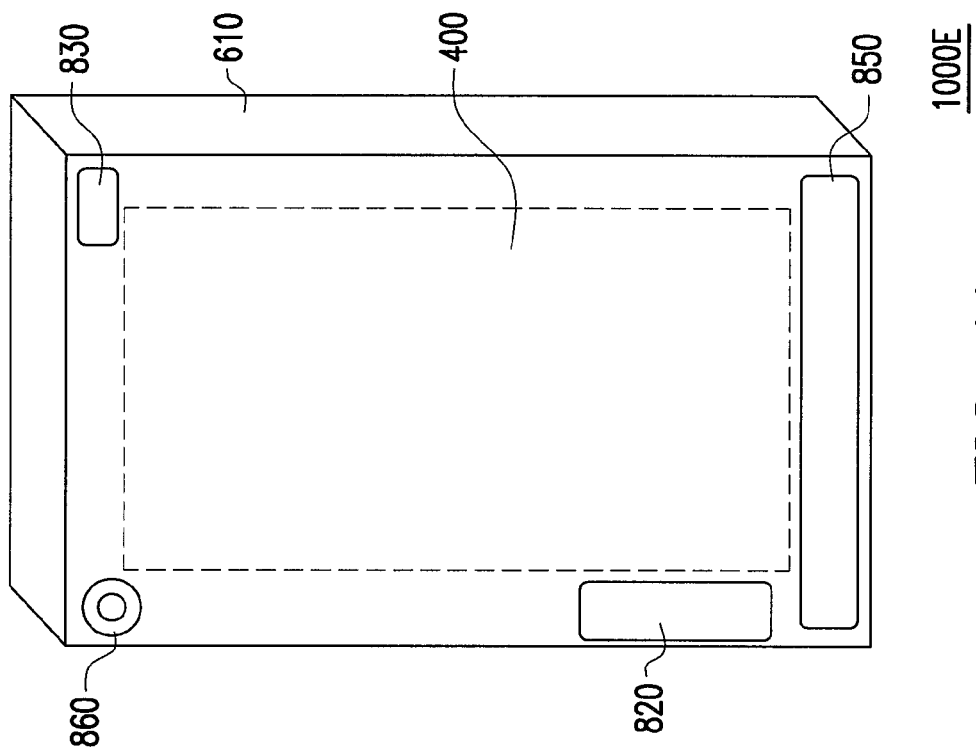
FIG. 11 is a schematic view of a display device in accordance with another embodiment of the invention.

In the present embodiment, the transmission display panel 100, the first backlight module 200, the first polarizer 300, and the reflective polarizer 400 of the display device 1000 can be fixed within a frame 610 (as shown in FIG. 11). When a user likes to use the transparent display, the user may pick up the frame 610 to separate the display device 1000 (includes the transmission display panel 100, the first backlight module 200, the first polarizer 300, and the reflective polarizer 400) from the host 500. At this time, the first backlight module 200 is turned on while the second backlight module 520 is turned off. A wireless transmission unit 820 may be further disposed within the frame 610 (as shown in FIG. 11). The wireless transmission unit 820 receives signals from the host 500 to allow the transmission display panel 100 to display corresponding images.

On the other hand, when the user does not need the transparent display function, the user can assemble the display device 1000 with the host 500. At this time, the first backlight module 200 is turned off while the second backlight module 520 is turned on and served as the backlight source of the display device 1000. Because the second backlight module 520 has optical elements such as the optical films and the reflector, the second backlight module 520 allows the display device 1000 to have higher brightness with lower power consumption compared to the first backlight module 200. In other words, the display device 1000 in the present embodiment offers the advantages of both a transparent display and a general display by the separable host 500 therethrough.

Second Embodiment

Figure 4:
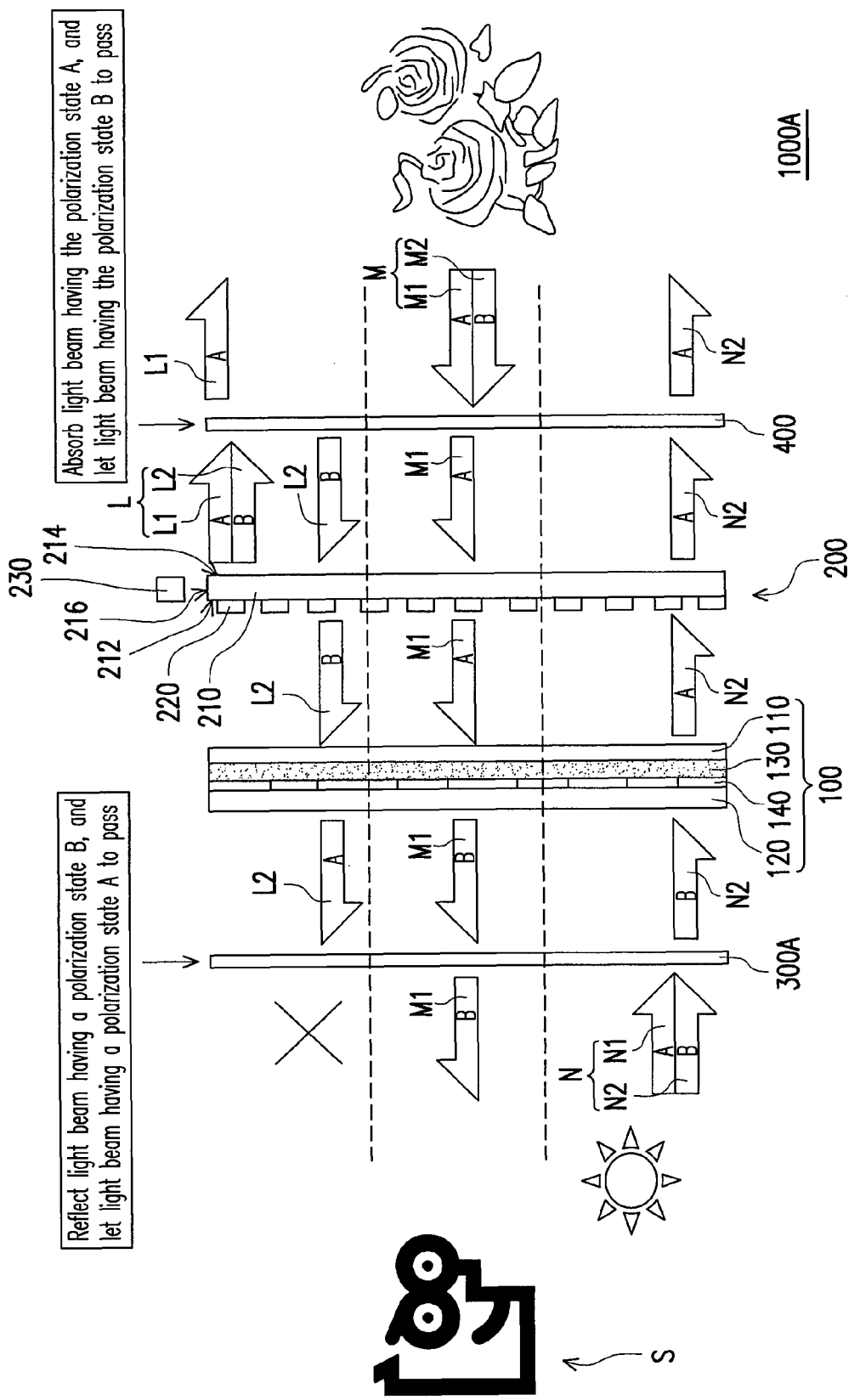
FIG. 4 is a schematic view of a display device in accordance with the second embodiment of the invention.

FIG. 4 is a schematic view of a display device according to the second embodiment of the invention. Referring to FIG. 4, the display device 1000A in the present embodiment is similar to the display device 1000 in the first embodiment. Thus, like reference numerals refer to like elements in the two embodiments. The difference between the display device 1000A in the present embodiment and the display device 1000 in the first embodiment is that the polarization state of the first transmission axis of the first polarizer 300A in the present embodiment is different from the polarization state of the first transmission axis of the first polarizer 300 in the first embodiment. This difference will be explained as followed, while other similar aspects of the two embodiments will not be described.

In the present embodiment, the polarization state of the first transmission axis of the first polarizer 300A is perpendicular to the polarization state of the second transmission axis of the reflective polarizer 400. To be specific, the first polarizer 300A has a first transmission axis parallel to the second polarization state B. The reflective polarizer 400 has a second transmission axis parallel to the first polarization state A and is capable of reflecting the second sub light beam L2 in the second polarization state B.

The transmissions of the light beam L emitted by the first backlight module 200, the background light beam M, and the ambient light beam N in the display device 1000A of the present embodiment will be explained with reference to FIG. 4 and FIG. 5 as followed. For the convenience of description, FIG. 4 illustrates the transmissions of the light beam L emitted by the first backlight module 200, the background light beam M, and the ambient light beam N in the display device 1000A of the present embodiment when all the pixels of the transmission display panel 100 are disabled. The transmission of the light beam L emitted by the first backlight module 200 in the display device 1000A will be explained first referring to the upper part of FIG. 4. Most part of the light beam L emitted by the first backlight module 200 is transmitted to the reflective polarizer 400 through the second surface 214. The light beam L1 in the first polarization state A in the light beam L passes through the reflective polarizer 400 to leave the display device 1000. The second sub light beam L2 in the second polarization state B of the light beam L is reflected by the reflective polarizer 400 to pass through the first light guide plate 210 and transmits to the transmission display panel 100. In the present embodiment, part of the pixels of the transmission display panel 100 of the display device 1000A are disabled (as shown in FIG. 4, all the pixels are disabled). At this time, after the second sub light beam L2 in the second polarization state B passes through the transmission display panel 100, the polarization state of the second sub light beam L2 changes to the first polarization state A. The second sub light beam L2 in the first polarization state A transmits to the first polarizer 300A after it passes through the transmission display panel 100. Because the first transmission axis of the first polarizer 300A is parallel to the second polarization state B and the first polarization state A is perpendicular to the second polarization state B, the second sub light beam L2 in the first polarization state A cannot pass through the first polarizer 300A in the present embodiment. In other words, the user S should see a black image displayed on the transmission display panel 100.

Referring to the middle part of FIG. 4, the transmission of the background light beam M in the display device 1000A will be explained. The background light beam M also includes a sub light beam M1 in the first polarization state A and a sub light beam M2 in the second polarization state B. The sub light beam M1 in the first polarization state A of the background light beam M passes through the reflective polarizer 400. The sub light beam M1 that passes through the reflective polarizer 400 and has the first polarization state A passes through the first light guide plate 210 to reach the transmission display panel 100. When part of the pixels of the transmission display panel 100 of the display device 1000A is disabled, at this time, after the sub light beam M1 in the first polarization state A passes through the transmission display panel 100, the polarization state of the sub light beam M1 changes to the second polarization state B in the present embodiment. The sub light beam M1 in the second polarization state B is transmitted to the first polarizer 300A. Because the first transmission axis of the first polarizer 300A is parallel to the second polarization state B, the sub light beam M1 in the second polarization state B can pass through the first polarizer 300A in the present embodiment. At this time, the user S can see the background. In other words, the display device 1000A is almost transparent to the user S.

Referring to the bottom part of FIG. 4, the transmission of the ambient light beam N in the display device 1000A will be explained. The ambient light beam N also includes a sub light beam N1 in the first polarization state A and a sub light beam N2 in the second polarization state B. The sub light beam N1 in the first polarization state A of the ambient light beam N passes through the first polarizer 300A to reach the transmission display panel 100. When part of the pixels of the transmission display panel 100 of the display device 1000A is disabled in the present embodiment, at this time, after the sub light beam N2 in the second polarization state B passes through the transmission display panel 100, the polarization state of the sub light beam N2 changes to the first polarization state A. After that, the sub light beam N2 in the first polarization state A passes through the first light guide plate 210 to reach the reflective polarizer 400. The sub light beam N2 then passes through the reflective polarizer 400 to leave the display device 1000A. In other words, in the display device 1000A of the present embodiment, the ambient light beam N does not interfere with the presentation of the background or affect the brightness of a black image.

Figure 5:
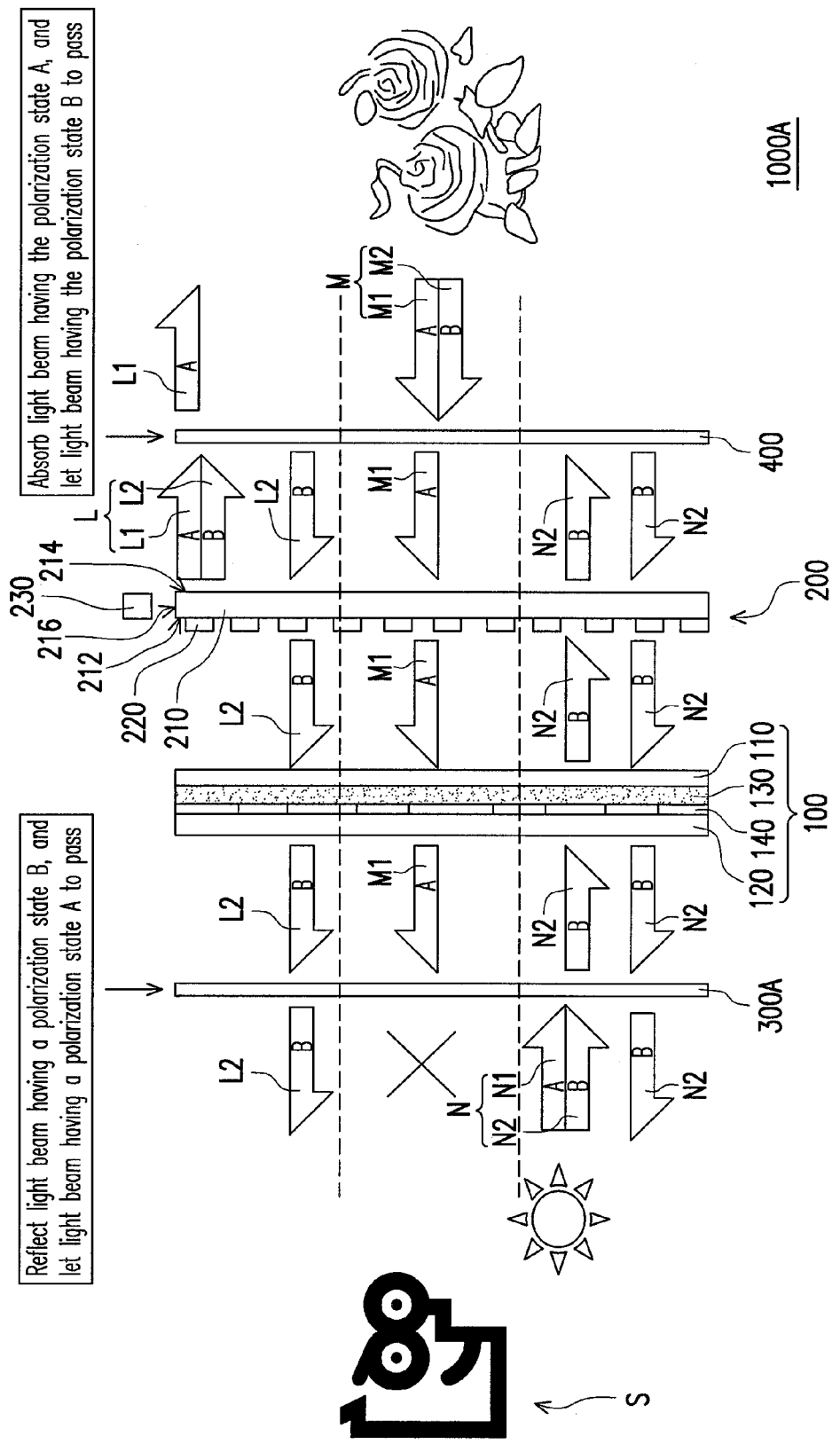
FIG. 5 illustrates the transmissions of a light beam emitted by a first backlight module, a background light beam, and an ambient light beam when a display device is in display mode in accordance with the second embodiment of the invention.

FIG. 5 illustrates the transmissions of a light beam emitted by a first backlight module, a background light beam, and an ambient light beam in a display device according to a second embodiment of the invention. For the convenience of description, FIG. 5 illustrates the situation of the display device 1000A in the present embodiment when all the pixels of the transmission display panel 100 are enabled. Referring to the upper part of FIG. 5, the transmission of the light beam L emitted by the first backlight module 200 in the display device 1000A will be explained first. Most part of the light beam L emitted by the first backlight module 200 is transmitted to the reflective polarizer 400 through the second surface 214. The light beam L1 in the first polarization state A of the light beam L passes through the reflective polarizer 400 to leave the display device 1000A. The second sub light beam L2 in the second polarization state B of the light beam L is reflected by the reflective polarizer 400 to pass through the first light guide plate 210 and then transmit to the transmission display panel 100. When part of the pixels of the transmission display panel 100 of the display device 1000A are enabled (in FIG. 5, all the pixels are enabled), at this time, after the second sub light beam L2 in the second polarization state B passes through the transmission display panel 100, the polarization state of the second sub light beam L2 remains unchanged in the present embodiment. The second sub light beam L2 in the second polarization state B transmits to the first polarizer 300A after it passes through the transmission display panel 100. In the present embodiment, because the first transmission axis of the first polarizer 300A is parallel to the second polarization state B, the second sub light beam L2 in the second polarization state B can pass through the first polarizer 300A. In other words, the user S should see a white image displayed on the transmission display panel 100 (i.e., when a pixel is completely enabled, the pixel presents white color. With different enabled states of different pixels, the user S should see images composed of pixels of different colors on the transmission display panel 10).

Referring to the middle part of FIG. 5, the transmission of the background light beam M in the display device 1000A will be explained. The sub light beam M1 in the first polarization state A of the background light beam M passes through the reflective polarizer 400. The sub light beam M1 that passes through the reflective polarizer 400 and has the first polarization state A passes through the first light guide plate 210 to reach the transmission display panel 100. When part of the pixels of the transmission display panel 100 of the display device 1000A is enabled, at this time, after the sub light beam M1 in the first polarization state A passes through the transmission display panel 100, the polarization state of the sub light beam M1 remains unchanged in the present embodiment. The sub light beam M1 in the first polarization state A transmits to the first polarizer 300A after it passes through the transmission display panel 100. In the present embodiment, because the first transmission axis of the first polarizer 300A is parallel to the second polarization state B, and the first polarization state A is perpendicular to the second polarization state B, the sub light beam M1 in the first polarization state A is blocked by the first polarizer 300A and won't transmit to the eyes of the user S. In other words, the user S observes the colors normally presented by the pixels of the transmission display panel 100, and the background light beam M does not interfere with the presentation of the pixels of the transmission display panel 100.

Referring to the bottom part of FIG. 5, the transmission of the ambient light beam N in the display device 1000A will be explained. The sub light beam N2 in the second polarization state B of the ambient light beam N passes through the first polarizer 300A to reach the transmission display panel 100. When part of the pixels of the transmission display panel 100 of the display device 1000A is enabled, at this time, after the sub light beam N2 in the second polarization state B passes through the transmission display panel 100, the polarization state of the sub light beam N2 remains unchanged in the present embodiment. After that, the sub light beam N2 in the second polarization state B passes through the first light guide plate 210 to reach the reflective polarizer 400. Then, the sub light beam N2 is reflected by the reflective polarizer 400 to sequentially pass through the first light guide plate 210 and the transmission display panel 100. After the sub light beam N1 in the second polarization state B passes through the transmission display panel 100, the polarization state of the sub light beam N1 remains unchanged, and the sub light beam N1 passes through the first polarizer 300A thereafter. In other words, part of the ambient light beam N can be served as a backlight source of the transmission display panel 100 so that the brightness of images displayed by the transmission display panel 100 can be further increased. Additionally, the display device 1000A in the present embodiment has similar functions and advantages as the display device 1000 in the first embodiment, and these functions and advantages will not be described again herein.

Third Embodiment

Figure 6:
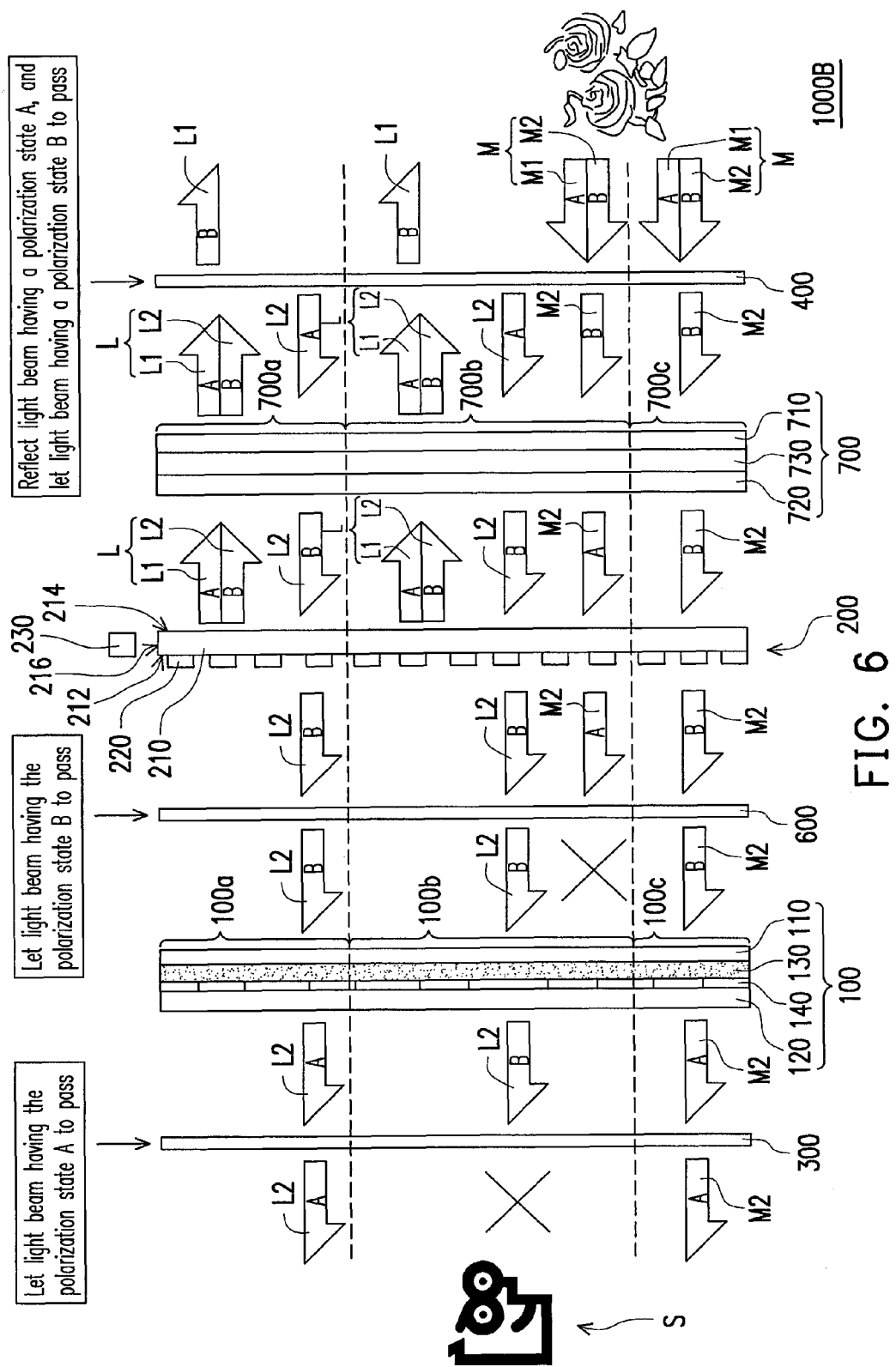
FIG. 6 is a schematic view of a display device in accordance with the third embodiment of the invention.

FIG. 6 is a schematic view of a display device according to the third embodiment of the invention. Referring to FIG. 6, the display device 1000B in the present embodiment is similar to the display device 1000 in the first embodiment. Thus, like reference numerals refer to like elements in the two embodiments. The difference between the display device 1000B in the present embodiment and the display device 1000 in the first embodiment is that the display device 1000B in the present embodiment further includes a second polarizer 600 and a light modulation panel 700. The difference will be explained as followed, while other similar aspects of the two embodiments will not be described.

In the present embodiment, the display device 1000B includes a transmission display panel 100, a first backlight module 200, a first polarizer 300, a second polarizer 600, a light modulation panel 700, and a reflective polarizer 400.

The transmission display panel 100 is between the first polarizer 300 and the second polarizer 600 in the present embodiment. The second polarizer 600 is disposed between the transmission display panel 100 and the first backlight module 200. The light modulation panel 700 is disposed between the first backlight module 200 and the reflective polarizer 400. In the present embodiment, the second polarizer 600 has an third transmission axis parallel to the second polarization state B.

The light modulation panel 700 in the present embodiment may be a super twisted nematic LCD panel. To be specific, the light modulation panel 700 includes a substrate 710 with active elements, a substrate 720 opposite to the substrate 710, and a super twisted nematic liquid crystal layer 730 between the substrate 710 and the substrate 720. In consideration of the cost, resolution, and transmittance, the light modulation panel 700 in the present embodiment does not have any color filter. However, the invention is not limited thereto. In other embodiments, the light modulation panel 700 may also be a twisted nematic LCD panel, a vertical alignment LCD panel, an in-plane switching LCD panel, a PDLC LCD panel, or any other suitable type of display panel.

Figure 7:
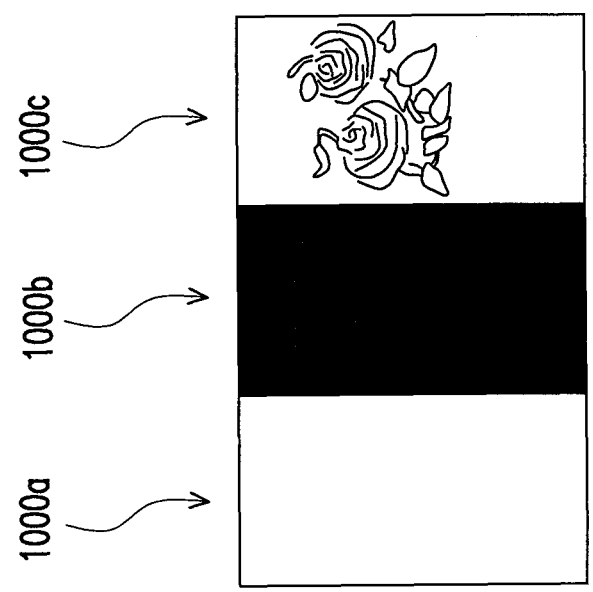
FIG. 7 illustrates an image displayed by the display device in FIG. 6 at a user terminal.

FIG. 7 illustrates an image displayed by the display device in FIG. 6 at an user terminal. Referring to FIG. 6 and FIG. 7, images carried by the display areas 100a and 100b of the transmission display panel in FIG. 6 are displayed in the display areas 1000a and 1000b (as shown in FIG. 7) of the display device 1000B in the present embodiment. For the convenience of description, the image displayed by the display device 1000B is divided into three display areas 1000a, 1000b, and 1000c, wherein an all-white image is displayed in the display area 1000a, and an all-black image is displayed in the display area 1000b. In the present embodiment, the background is displayed in the transparent area 1000c of the display device 1000B. It should be noted that when an all-black image is displayed in the display area 1000b or when an all-white image is displayed in the display area 1000a, the background light beam M does not pass through the area corresponding to the display area 100a or 100b in the first polarizer 300. In other words, when an all-black image is displayed in the display area 1000b or an all-white image is displayed in the display area 1000a, the background light beam M does not affect the brightness and chromatic behaviors of the display areas 1000a and 1000b. Thereby, the images displayed in the display areas 1000a and 1000b can have optimal optical properties.

Referring to the upper part of FIG. 6 and FIG. 7, most of the light beam L emitted by the first backlight module 200 is transmitted to the reflective polarizer 400 through the second surface 214. The light beam L is transmitted to the light modulation panel 700. The area 700a in the light modulation panel 700 is corresponding to the display area 100a for displaying the all-white image, and the area 700a in the light modulation panel 700 may be disabled. After the light beam L passes through the light modulation panel 700, the polarization state of the first sub light beam L1 changes to the second polarization state B, and the polarization state of the second sub light beam L2 changes to the first polarization state A. After that, the second sub light beam L2 in the first polarization state A is reflected by the reflective polarizer 400 to be transmitted back to the light modulation panel 700, and the first sub light beam L1 in the second polarization state B leaves from the reflective polarizer 400. After the second sub light beam L2 in the first polarization state A passes through the disabled area 700*a* in the light modulation panel 700 again, the polarization state of the second sub light beam L2 changes to the second polarization state B. Next, the second sub light beam L2 in the second polarization state B sequentially passes through the first backlight module 200 and the second polarizer 600 to reach the transmission display panel 100. The display area 100*a* in the transmission display panel 100 is corresponding to the display area 1000*a* for displaying all-white image, and the display area 100*a* in the transmission display panel 100 may be disabled. At this time, after the second sub light beam L2 from the first light guide plate 210 and in the second polarization state B passes through the disabled display area 100*a* of the transmission display panel 100, the polarization state of the second sub light beam L2 changes to the first polarization state A, and then the second sub light beam L2 passes through the first polarizer 300. Thereby, an all-white image is displayed in the display area 1000*a* corresponding to the display areas 100*a* and 700*a*.

Referring to the middle part of FIG. 6 and FIG. 7, most part of the light beam L emitted by the first backlight module 200 is transmitted to the reflective polarizer 400 through the second surface 214. The light beam L passes through the light modulation panel 700 to reach the reflective polarizer 400. The area 700*b* in the light modulation panel 700 is corresponding to the display area 1000*b* for displaying all-black image, and the area 700*b* of the light modulation panel 700 may be disabled. After the second sub light beam L2 in the second polarization state B passes through the area 700*b* of the light modulation panel 700, the polarization state of the second sub light beam L2 changes to the first polarization state A. After that, the second sub light beam L2 in the first polarization state A is reflected by the reflective polarizer 400 and transmitted back to the light modulation panel 700. After the second sub light beam L2 in the first polarization state A passes through the disabled area 700*b* in the light modulation panel 700 again, the polarization state of the second sub light beam L2 changes to the second polarization state B. Next, the second sub light beam L2 in the second polarization state B sequentially passes through the first backlight module 200 and the second polarizer 600 to reach the transmission display panel 100. The area 100*b* in the transmission display panel 100 is corresponding to the display area 1000*b* for displaying all-black image, and the area 100*b* in the display panel 100 may be enabled. At this time, after the second sub light beam L2 from the first light guide plate 210 and in the second polarization state B passes through the enabled area 100*b* in the transmissive display panel 100, the polarization state of the second sub light beam L2 remains unchanged, and the second sub light beam L2 cannot pass through the first polarizer 300. Thereby, an all-black image is displayed in the display area 1000*b* corresponding to the areas 100*b* and 700*b*.

It should be noted that the background light beam M may not pass through the area in the first polarizer 300 that is corresponding to the display area 1000*a* or 1000*b*. The background light beam M has the same behaviour in the display areas 1000*a* and 1000*b*. In the present embodiment, the behaviour of the background light beam M in the display area 1000*b* will be described only. Referring to the middle part of FIG. 6 and FIG. 7, to be specific, the sub light beam M2 in the second polarization state B of the background light beam M passes through the reflective polarizer 400 to reach the light modulation panel 700. The area 700*b* of the light modulation panel 700 may be disabled. At this time, the polarization state of the sub light beam M2 passing through the area 700*b* changes to the first polarization state A. Next, the sub light beam M2 in the first polarization state A passes through the first backlight module 200 to reach the second polarizer 600, while the sub light beam M1 in the first polarization state A cannot pass through the second polarizer 600. In other words, the background light beam M does not pass through the display area 1000*b* corresponding to the area for displaying all-black image, and similarly, the background light beam M does not pass through the display area 1000*a* corresponding to the area for displaying all-white image. Thereby, the user S can see high quality images (for example, high contrast and high chromaticity) in the display areas 1000*a* and 1000*b* without being affected by the background light beam M.

Referring to the bottom part of FIG. 6 and FIG. 7, the sub light beam M2 in the second polarization state B of the background light beam M passes through the reflective polarizer 400 to reach the light modulation panel 700. The area 700*c* in the light modulation panel 700 that is corresponding to the transparent area 1000*c* may be enabled. At this time, after the sub light beam M2 in the second polarization state B passes through the area 700*c*, the polarization state of the sub light beam M2 remains unchanged. After that, the sub light beam M2 in the second polarization state B sequentially passes through the first backlight module 200 and the second polarizer 600 to reach the transmission display panel 100. The area 100*c* in the transmission display panel 100 that is corresponding to the transparent area 1000*c* may be disabled. Herein, after the sub light beam M2 in the second polarization state B passes through the area 100*c*, the polarization state of the sub light beam M2 changes to the first polarization state A. Next, the sub light beam M2 in the first polarization state A passes through the first polarizer 300. In other words, the user S can see the background in the transparent area 1000*c*. Through the second polarizer 600 and the light modulation panel 700, the user S can enjoy both high-quality displayed images and the background in different areas of the display device 1000B.

Figure 8:
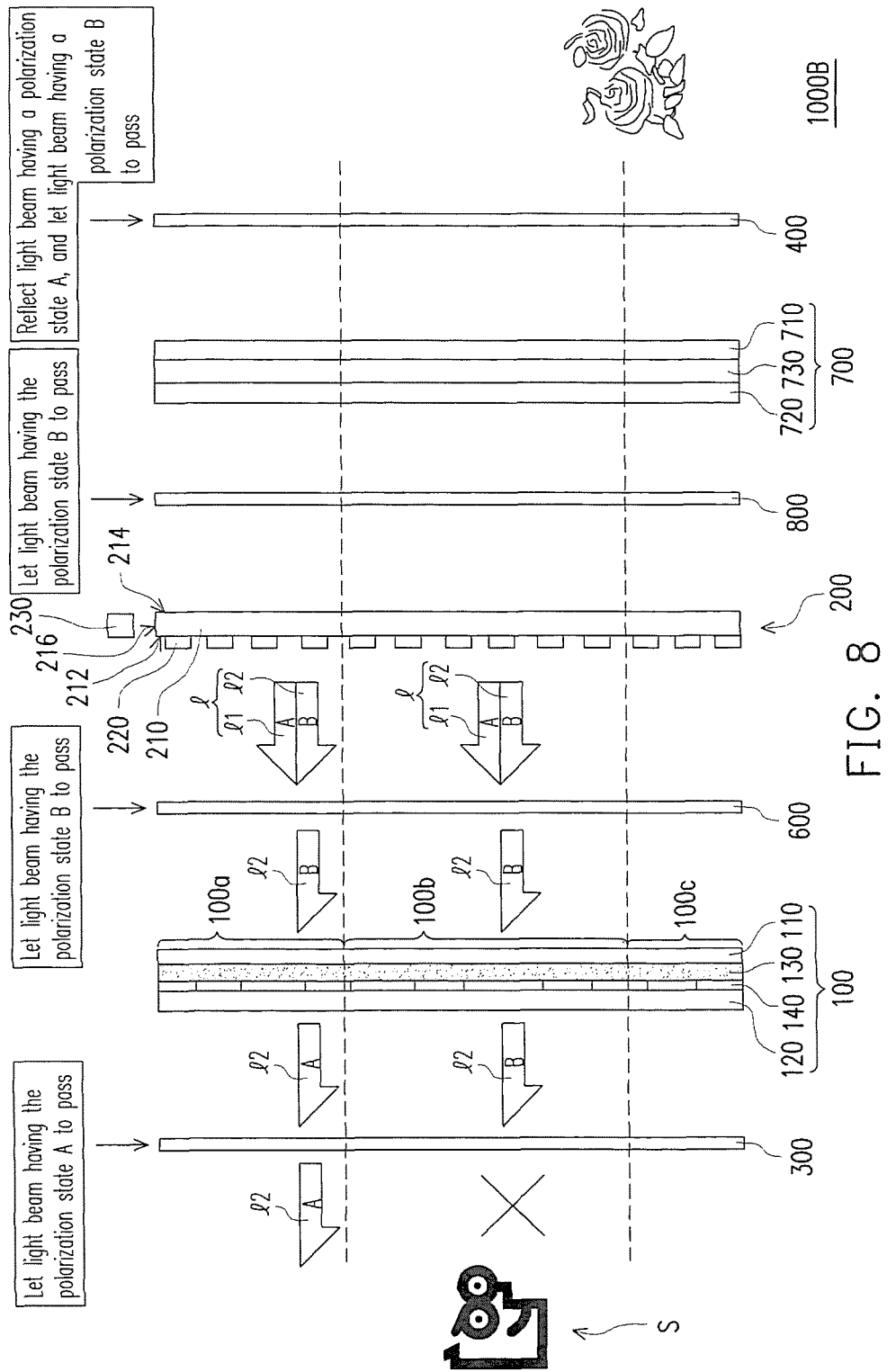
FIG. 8 is a schematic view of a display device in accordance with the fourth embodiment of the invention.

FIG. 8 is a schematic view of a display device according to a fourth embodiment of the invention. Referring to FIG. 8, the display device 1000B further includes an third polarizer 800 in the present embodiment. The third polarizer 800 is disposed between the first backlight module 200 and the light modulation panel 700. In the present embodiment, the third polarizer 800 has a transmission axis parallel to the second polarization state B. The polarization state of the transmission axis of the third polarizer 800 should be parallel to the polarization state of the transmission axis of the second polarizer 600, and the polarization states of the transmission axes of the first polarizer 300 and the reflective polarizer 400 are not limited herein. With the third polarizer 800, the contrast of the display device 1000B can be further increased, which will be explained as followed in detail referring to FIG. 8.

Referring to FIG. 7 and the upper part of FIG. 8, the problem that part of the light beam L in the second polarization state B is reflected, part of the ambient light beam N in the first polarization state A is transmitted, and accordingly the contrast is reduced caused by unsatisfactory light filtering effect of the reflective polarizer 400 can be resolved by disposing the third polarizer 800 in the present embodiment. In addition, a light beam 1 of a small quantity emitted by the first backlight module 200 is transmitted from the first surface 212 towards the user S. The light beam 1 includes a sub light beam 11 in the first polarization state A and a sub light beam 12 in the second polarization state B. The sub light beam 12 in the second polarization state B passes through the second polarizer 600 to reach the transmission display panel 100. The area 100a in the transmission display panel 100 that is corresponding to the display area 1000a may be disabled. Herein, after the sub light beam 12 in the second polarization state B passes through the area 100a, the polarization state of the sub light beam 12 changes to the first polarization state A. The sub light beam 12 in the first polarization state A passes through the first polarizer 300. In other words, half of the light beam 1 passes through the area in the first polarizer 300 that is corresponding to the display area 1000a, so the brightness of the white image displayed in the display area 1000a can be further increased.

Referring to FIG. 7 and the middle part of FIG. 8, in the present embodiment, the sub light beam 12 in the second polarization state B passes through the second polarizer 600 to reach the transmission display panel 100. The area 100b in the transmission display panel 100 that is corresponding to the display area 1000b may be enabled. Herein, after the sub light beam 12 in the second polarization state B passes through the area 100b, the polarization state of the sub light beam 12 remains unchanged. The sub light beam 12 in the second polarization state B cannot pass through the first polarizer 300. In other words, the light beam 1 cannot pass through the area in the first polarizer 300 that is corresponding to the display area 1000b. Accordingly, the brightness of the black image displayed in the display area 1000b is not increased. With the second polarizer 600, a small amount of light beam 1 transmitted towards the user S can increase the brightness of the white image but does not increase the brightness of the black image. In other words, the second polarizer 600 can increase the contrast of images displayed by the display device 1000B. Moreover, the display device 1000B in the present embodiment has similar functions and advantages as the display device 1000 in the first embodiment, and these functions and advantages will not be described herein.

Figure 9:
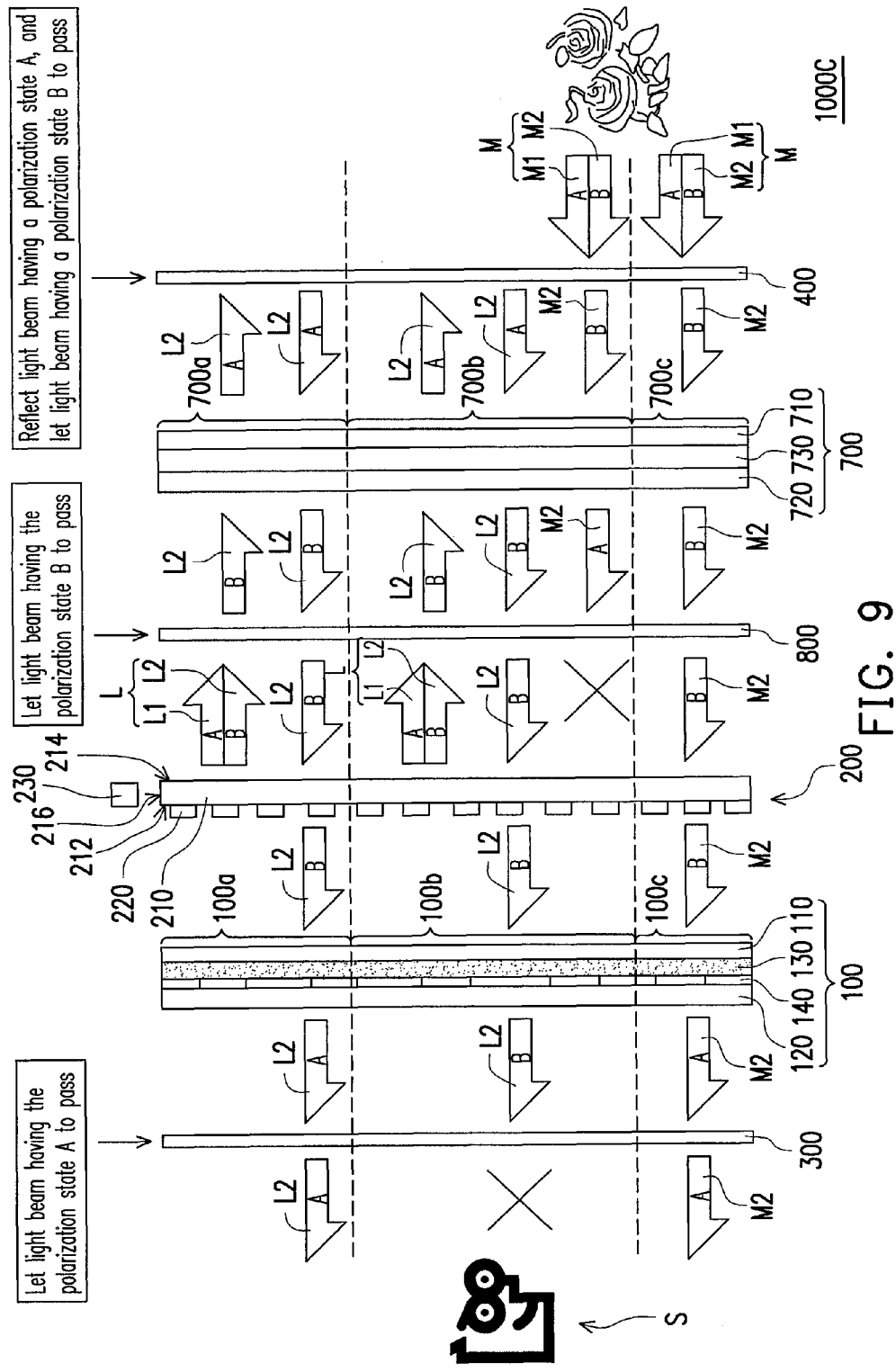
FIG. 9 is a schematic view of a display device in accordance with the fifth embodiment of the invention.

FIG. 9 is a schematic view of a display device according to a fifth embodiment of the invention. Referring to FIG. 9, the difference between the display device 1000C in the present embodiment and the display device 1000A in the second embodiment is that the display device 1000C in the present embodiment further includes an third polarizer 800 but does not include the second polarizer 600. The third polarizer 800 is between the light modulation panel 700 and the first backlight module 200. Additionally, the display device 1000C in the present embodiment has similar functions and advantages as the display device 1000A in the second embodiment, and these functions and advantages will not be described herein.

Each of the display device in the said second to fifth embodiments selectively includes a host 500. The structure and effect of the host 500 are similar to those described in the said first embodiment. Each of the display devices described in the said first to fifth embodiments may further include at least one of other devices that will be described below. Examples will be described as followed referring to FIGS. 10-15.

Figure 10:
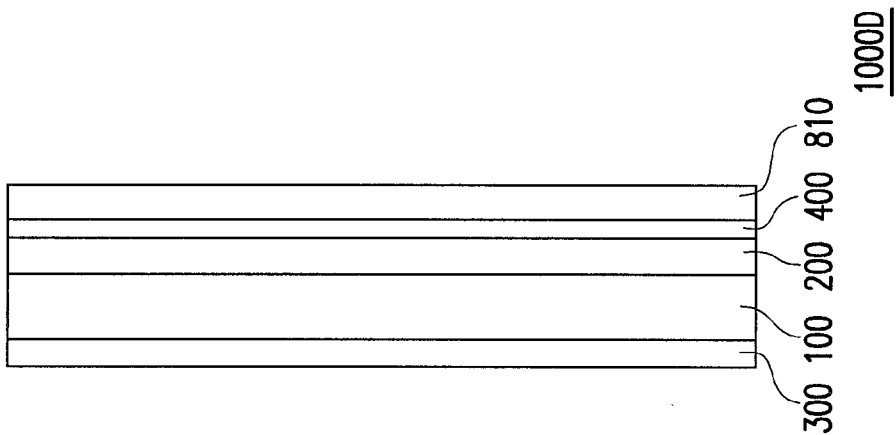
FIG. 10 is a schematic view of a display device in accordance with one embodiment of the invention.

FIG. 10 is a schematic view of a display device according to one embodiment of the invention. Referring to FIG. 10, the display device 1000D is similar to the first display device 1000. The display device 1000D further includes a fourth polarizer 810, and in which the reflective polarizer 400 is disposed between the fourth polarizer 810 and the first backlight module 200. The fourth polarizer 810 has a fifth transmission axis. The axial direction of the fifth transmission axis is the equal to that of the second transmission axis of the reflective polarizer 400. The working theory of the fourth polarizer 810 is similar to that described in the said embodiments, and the fourth polarizer 810 can increase the contrast and chromaticity of the display device 1000D.

FIG. 11 is a schematic view of a display device according to another embodiment of the invention. Referring to FIG. 11, the display device 1000E is similar to the first display device 1000. The display device 1000E further includes a wireless transmission module 820. The wireless transmission module 820 is capable of transmitting signals between a host (not shown in FIG. 11) and a transmission display panel (not shown in FIG. 11) or between the host and a light modulation panel (not shown in FIG. 11). The display device 1000E further includes a photosensor 830. The photosensor 830 is used for sensing the brightness of ambient light and providing a sensing signal to adjust the driving voltage of the light modulation panel 700, so as to change the transparency of the display device 1000E.

Figure 12:
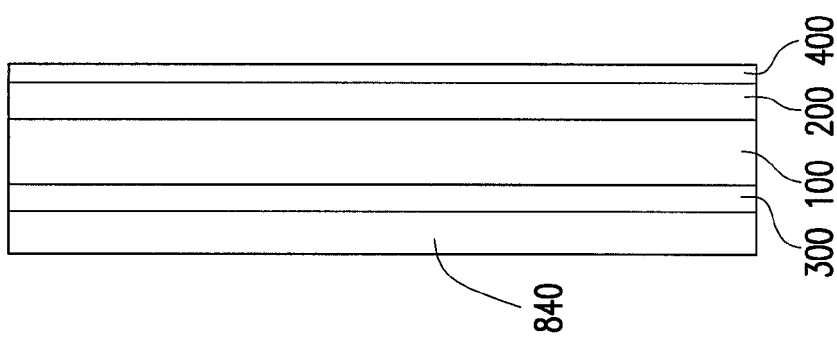
FIG. 12 is a side perspective view of the display device in FIG. 11.

FIG. 12 is a side perspective view of the display device in FIG. 11. Referring to FIG. 12, the display device 1000E further includes a touch screen 840. The touch screen 840 is disposed on the surface of the first polarizer 300, and the first polarizer 300 is between the touch screen 840 and the transmission display panel 100. Referring to FIG. 11, the display device 1000E further includes a battery 850. The battery 850 supplies the power required by the display device 1000E. The display device 1000E further includes an image capturing module 860. The image capturing module 860 is disposed beside the reflective polarizer 400.

Figure 13:
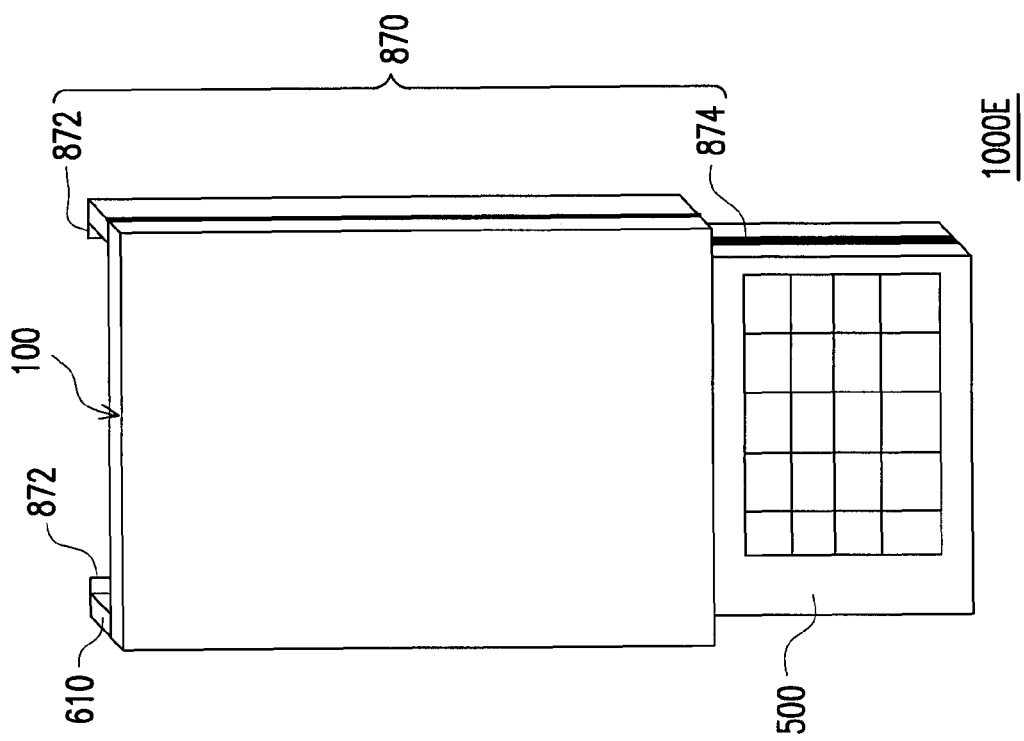
FIG. 13 illustrates the display device in FIG. 11 in sliding state.

FIG. 13 illustrates the display device in FIG. 11 in sliding state. Referring to FIG. 13, the display device 1000E further includes a sliding apparatus 870. The sliding apparatus 870 is disposed on the host 500 and a frame. To be specific, the sliding apparatus 870 includes a slide rail 872 disposed on the frame 610 and a sliding slot 874 disposed on the host 500. The sliding apparatus 870 allows the host 500 to slide relative to the transmission display panel 100. To be more specific, the sliding apparatus 870 allows the host 500 to slide relative to other components (for example, the transmission display panel 100, the first backlight module 200, the first polarizer 300, and the reflective polarizer 400, etc) of the display device 1000E. The sliding apparatus 870 in the display device 1000E makes the host 500 overlapped not completely with other components of the display device 1000E, and the display device 1000E can be used as a transparent display.

Figure 14:
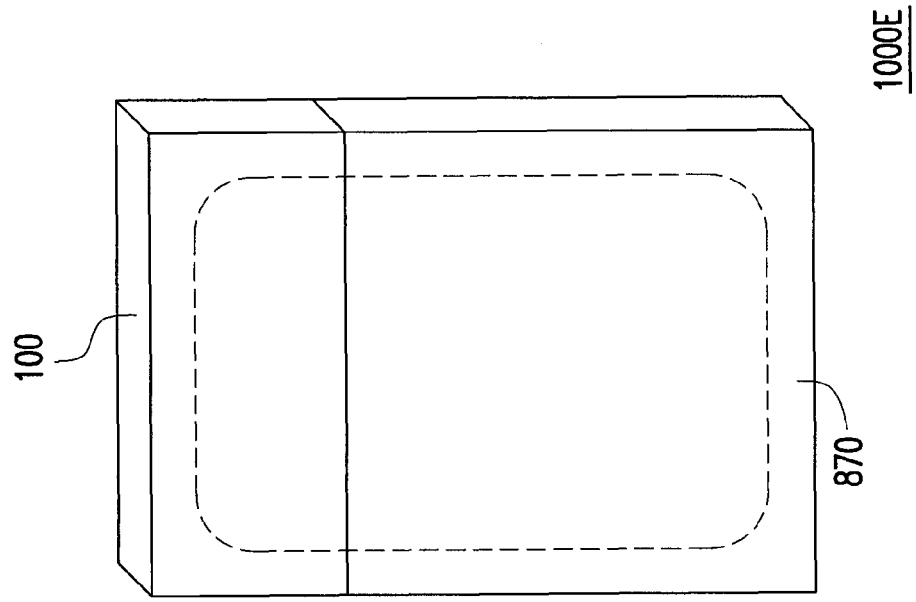
FIG. 14 illustrates the display device in FIG. 13.
Figure 15:
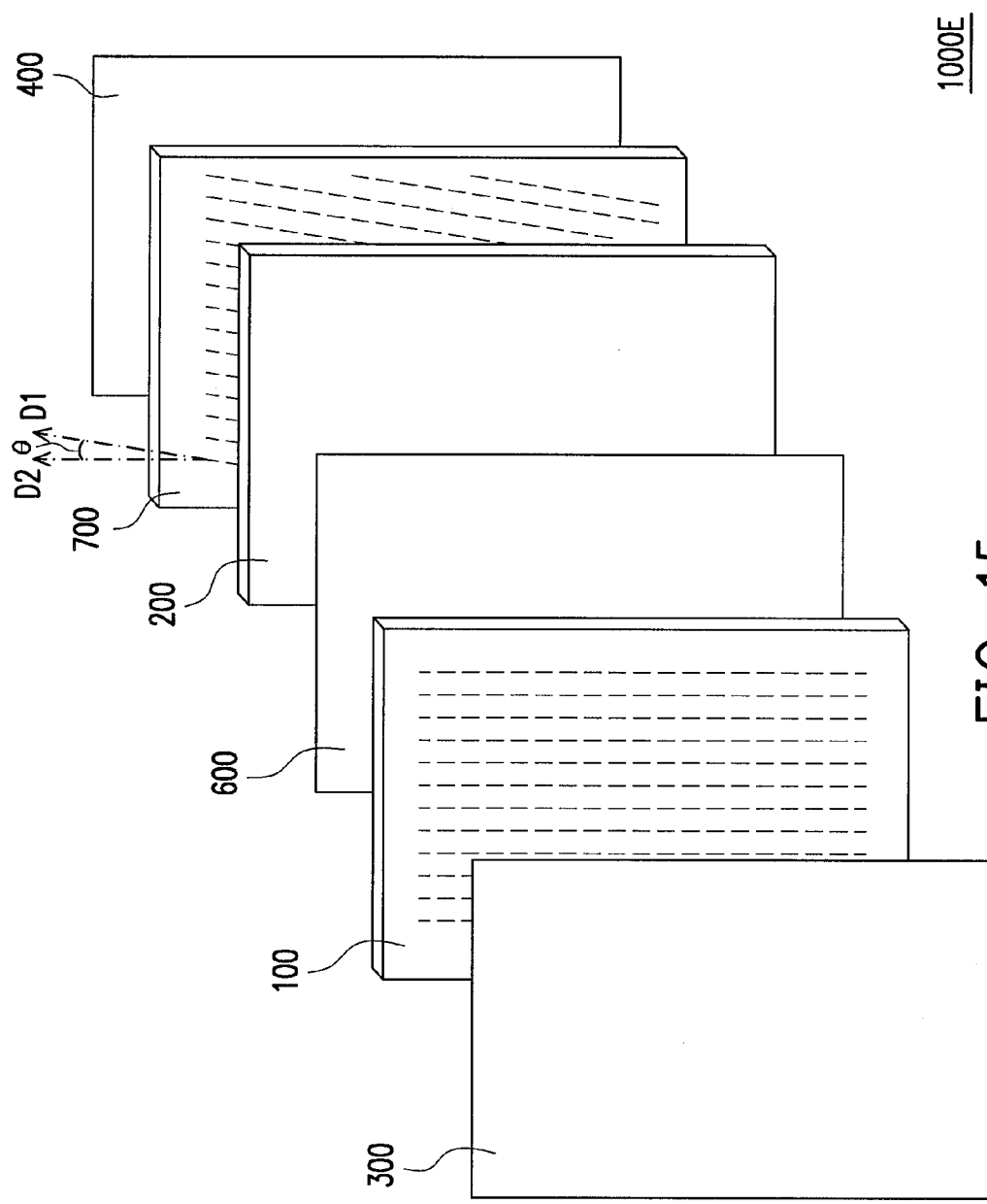
FIG. 15 is an explosion view of the display device in FIG. 13.

FIG. 14 illustrates the display device in FIG. 13. Referring to FIG. 14, the display device 1000E further includes a non-transmission display panel 870. The non-transmission display panel 870 and the transmission display panel 100 are disposed side by side to comprise a display image of the display device 1000E. FIG. 15 is an explosion view of the display device in FIG. 13. Particularly, the frame 610, the sliding apparatus 870, and the host 500 in FIG. 13 are not illustrated in FIG. 15. Referring to FIG. 15, in the display device 1000E, the pixel array arrangement direction D1 of the light modulation panel 700 and the pixel array arrangement direction D2 of the transmission display panel 100 form an included angle θ. The included angle θ is smaller than or equal to 15°. Thereby, the moiré effect produced in a user's vision can be avoided when the display device is designed very slim and accordingly the light modulation panel 700 and the transmission display panel 100 are too close to each other.

As described above, the images displayed on a transmission display panel are not affected by the background light beam with a backlight module and a reflective polarizer in a display device provided by one embodiment of the invention. And when the intensity of the background light beam is not enough, a user can still see the images displayed on the transmission display panel.

In the display device provided by another embodiment of the invention, an user can enjoy high-quality images and the background at the same in different display areas by a light modulation panel.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A display device, comprising:
    a transmission display panel;
    a first backlight module, comprising:
        a first light guide plate, having a first surface, a second surface opposite to the first surface, and a first light incident surface connecting the first surface and the second surface, wherein the first surface is between the second surface and the transmission display panel; and
        a light emitting unit, disposed beside the first light incident surface of the first light guide plate, wherein the light emitting unit is capable of emitting a light beam, and the light beam comprises a first sub light beam in a first polarization state and a second sub light beam in a second polarization state, the first polarization state is orthogonal to the second polarization state, after the second sub light beam passes through an enabled area of the transmission display panel, a polarization state of the second sub light beam remains unchanged, and after the second sub light beam passes through a disabled area of the transmission display panel, the polarization state of the second sub light beam changes from the second polarization state to the first polarization state;
    a first polarizer, wherein the transmission display panel is between the first polarizer and the first surface of the first light guide plate, and the first polarizer has a first transmission axis equal to the first polarization state;
    a reflective polarizer, wherein the second surface of the first light guide plate is between the first surface and the reflective polarizer, the reflective polarizer has a second transmission axis equal to the second polarization state and is capable of reflecting the first sub light beam in the first polarization state;
    a second polarizer, wherein the first surface of the first light guide plate is between the second surface and the second polarizer, and the second polarizer has a third transmission axis equal to the second polarization state; and
    a light modulation panel, wherein the second surface of the first light guide plate is between the light modulation panel and the first surface of the first light guide plate, and the light modulation panel is between the second surface of the first light guide plate and the reflective polarizer.

2. The display device according to claim 1, wherein the light emitting unit comprises at least one first color light emitting element, at least one second color light emitting element, and at least one third color light emitting element, and the first color light emitting element, the second color light emitting element, and the third color light emitting element are capable of sequentially emitting a first color light beam, a second color light beam, and a third color light beam according to images displayed on the transmission display panel.

3. The display device according to claim 2, wherein the transmission display panel is a monochromatic panel, and the monochromatic panel comprises a first substrate, a second substrate opposite to the first substrate, and a liquid crystal layer between the first substrate and the second substrate.

4. The display device according to claim 1 further comprising a host, wherein the host is detachable and assembled with the display device and has a second backlight module, and the reflective polarizer is between the second backlight module and the first backlight module.

5. The display device according to claim 4, wherein when the host of the display device is disassembled from the display device, the first backlight module is turned on and the second backlight module is turned off, and when the host of the display device is assembled with the display device, the first backlight module is turned off and the second backlight module is turned on.

6. The display device according to claim 1 further comprising a third polarizer between the second surface of the first light guide plate and the light modulation panel.

7. The display device according to claim 6, wherein the third polarizer has a fourth transmission axis equal to a polarization state of the third transmission axis of the second polarizer.

8. The display device according to claim 1 further comprising:
    a third polarizer, wherein the second surface of the first light guide plate is between the first surface and the third polarizer.

9. The display device according to claim 1, wherein the first backlight module further comprises a plurality of optical microstructures, and the optical microstructures are disposed on the first surface of the first light guide plate.

10. The display device according to claim 1, wherein the first light guide plate is a wedge-shaped light guide plate.

11. The display device according to claim 1, wherein after the second sub light beam in the second polarization state passes through a disabled area of the light modulation panel, a polarization state of the second sub light beam changes to the first polarization state, and after the second sub light beam in the second polarization state passes through an enabled area of the light modulation panel, the polarization state of the second sub light beam remains unchanged.

12. The display device according to claim 1, wherein the light modulation panel is a monochromatic panel, and the monochromatic panel comprises a first substrate, a second substrate opposite to the first substrate, and a liquid crystal layer between the first substrate and the second substrate.

13. The display device according to claim 1 further comprising a fourth polarizer, wherein the reflective polarizer is between the fourth polarizer and the light modulation panel, the fourth polarizer has a fifth transmission axis, and a polarization state of the fifth transmission axis is the equal to a polarization state of the second transmission axis of the reflective polarizer.

14. The display device according to claim 1 further comprising a wireless transmission module for transmitting signals between the host and the transmission display panel or between the host and the light modulation panel.

15. The display device according to claim 1 further comprising a slide rail disposed between the host and the transmission display panel, wherein the slide rail allows the host to slide relative to the transmission display panel.

16. The display device according to claim 1, wherein a pixel array arrangement direction of the light modulation panel and a pixel array arrangement direction of the transmission display panel form an included angle smaller than or equal to 15°.

17. The display device according to claim 1 further comprising a photosensor, wherein the photosensor is capable of sensing a brightness of an ambient light and providing a sensing signal to adjust a driving voltage of the light modulation panel, so as to change a transparency of the display device.

18. The display device according to claim 1 further comprising a touch screen disposed on a surface of the first polarizer, wherein the first polarizer is between the touch screen and the transmission display panel.

19. The display device according to claim 1 further comprising a battery capable of supplying power to the display device.

20. The display device according to claim 1 further comprising an image capturing module disposed beside the reflective polarizer.

21. The display device according to claim 1 further comprising a non-transmission display panel, wherein the non-transmission display panel and the transmission display panel are disposed side by side to construct a display image of the display device.

* * * * *